United States Patent [19]
Schumacher

[11] Patent Number: 5,988,216
[45] Date of Patent: Nov. 23, 1999

[54] HYDRAULIC SLEEVE FOR HYDRAULIC COUPLING

[76] Inventor: Gustav Schumacher, Gartenstrasse 8, 57612 Eichelhardt, Germany

[21] Appl. No.: 09/066,202

[22] Filed: Apr. 24, 1998

[30] Foreign Application Priority Data

Apr. 26, 1997 [DE] Germany ............... 197 17 820

[51] Int. Cl.$^6$ ..................................... F16L 37/28
[52] U.S. Cl. ..................... 137/614.05; 137/614
[58] Field of Search ............... 137/614, 614.05, 137/614.06

[56] References Cited

U.S. PATENT DOCUMENTS

| | | | |
|---|---|---|---|
| 3,680,591 | 8/1972 | Vik | 137/614.05 |
| 4,009,729 | 3/1977 | Vik | 137/614.05 |
| 4,564,042 | 1/1986 | Ekman | 137/614.05 |
| 5,316,033 | 5/1994 | Schumacher et al. | 137/614.05 |
| 5,586,748 | 12/1996 | Kish | 137/614.05 |

FOREIGN PATENT DOCUMENTS

| | | |
|---|---|---|
| 43 18 840 C2 | 1/1994 | Germany. |
| 196 19 839 C1 | 5/1997 | Germany. |

*Primary Examiner*—A. Michael Chambers
*Attorney, Agent, or Firm*—Harness, Dickey, & Pierce, P.L.C.

[57] ABSTRACT

A coupling sleeve (1) for a hydraulic coupling has a member to receive and arrest a coupling plug. To open the plug valve of the coupling plug, a switching pin (16) is provided which passes through the valve body (9) of the coupling sleeve (1). In the open position, the pin (16) projects beyond the end face (12) into the receiving means (6). If the switching member (30) is opened by mistake, and it is to be returned to its closed position, the switching pin (16) must move into the starting position against the pressure in the sleeve chamber (37). To accomplish this movement, the switching pin (16) has an opening valve. The opening valve has an opening valve body (21) arranged in a through-channel (17) in the switching pin (16). The through-channel effects a connection between the receiving means (6) and the sleeve chamber (37) when the switching member (30) is returned into a closed position. Thus, the switching member (30) is able to return against the pressure building up in the sleeve chamber (37).

5 Claims, 2 Drawing Sheets

HYDRAULIC SLEEVE FOR HYDRAULIC COUPLING

BACKGROUND OF THE INVENTION

The invention relates to a coupling sleeve for a hydraulic coupling. The coupling sleeve comprises receiving means to receive and arrest a coupling plug. The coupling plug includes a plug valve. The coupling sleeve further comprises a valve seat and a valve body. The valve body may be moved relative to the valve seat along a longitudinal axis into an open position or closed position. Towards the closed position, the valve body is loaded by a closing spring. A switching pin opens the plug valve. The switching pin passes through the valve body in the direction of the longitudinal axis. The switching pin leaves the body through a through-bore in the valve body in the direction of receiving member. The plug valve also includes a sleeve valve. A sleeve chamber is positioned between the sleeve valve and the valve seat of the valve body. A switching member is pivotably settable between two positions to establish a connection between a pressure agent connection at the sleeve end and the coupling plug. The switching member, with the coupling plug arrested in the receiving means, sets the valve body against the force of the closing spring. In order to switch the sleeve valve into the open position, the switching member is rotated to move the switching pin into the receiving member against the force of an opening spring to open the plug valve. The switching member, in an open position and with the coupling plug in the uncoupled position, enables automatic transfer to the valve body and sleeve valve into a closed position.

A coupling sleeve is described in DE 43 18 840 C2. Here, in case a coupling plug is unintentionally pulled out of the coupling sleeve with the valve body in the open position, or in case of unintentional actuation of the switching member, the coupling sleeve is transferred from the closed position into the open position, with the coupling plug in the uncoupled position, the oblong hole in the switching member provides a closed position for the valve body relative to the valve seat in the coupling sleeve. To close the sleeve valve and subsequently return the switching member into the closed position, it is difficult because the switching pin has to be moved against the prevailing system pressure in the sleeve chamber. This procedure is particularly complicated if, in the supply pipe in front of the sleeve valve, a blocking valve or a similar switching valve is present in a locked position. Thus, an enclosed volume exists which cannot be compressed. Under such pressure conditions, the pressure existing in the sleeve chamber cannot be reduced.

The unpublished DE 196 19 839 C1 reference describes a way to facilitate moving the valve body into an open position. Here, the shaft portion, which has one or several grooves on the outer face, is moved out of the valve body through the through-bore towards the receiving chamber to receive the coupling plug. The grooves extend parallel to the longitudinal axis. Also, the portion may include a stepped diameter. The grooves and stepped diameter ensure, provided the switching pin is in the correct position relative to the through-bore, that the pressure agent can escape from the sleeve chamber into the receiving chamber. According to a further solution described by the above reference, a metallic seal is provided in the form of a conical seat which comes to rest against a corresponding edge of the through-bore in the valve body when the coupling sleeve is in the closed position. However, if the switching pin is moved out of its closed position into the open position, pressure agent may escape from the sleeve chamber between the wall of the through-bore and the outer circumference of the sleeve chamber. This is also the case if the coupling sleeve is unintentionally opened when the coupling plug has been removed, with the switching pin in its forward position. Admittedly, the above-described measures facilitate the coupling operation, but the assembly is no longer leak-proof. This enables the pressure agent contained in the sleeve chamber to escape. Accordingly, since pressure agent quantities are in the region of several cubic centimeters, the escape constitutes an undesirable quantity.

SUMMARY OF THE INVENTION

It is therefore an object of the invention to provide a coupling sleeve where even if the switching member is unintentionally transferred into the open position, leakage is reduced to a minimum. At the same time, the coupling sleeve enables an easy transfer into the open position against prevailing pressure in the sleeve chamber.

In accordance with the invention, a switching pin has a through channel which is open towards its end face facing the coupling plug end. An opening valve is arranged in the sleeve chamber. The opening valve has a valve seat and an opening valve body. The opening valve body is loaded by a pressure spring against the prevailing pressure in the sleeve chamber. The prevailing pressure acts towards establishing contact with the valve seat. The valve body is associated with a soft seal. The soft seal is arranged in the region of the through-bore and has a sealing effect relative to the pin portion of the switching pin. The pin portion projects from the sleeve body.

An advantage of this embodiment is that between the switching pin portion projecting from the valve body and the valve body, the soft seal ensures leak-proof sealing conditions. Thus, the pressure agent cannot emerge from the region. Easy opening is achieved by an opening valve which has relatively small dimensions and enables only a certain amount of pressure agent to escape outwardly into the receiving member of the coupling sleeve. The amount of pressure agent which escapes while the switching member is returned to the closed position after being mistakenly transferred into the open position or after the coupling plug has been pulled out while the valve is in the open position, corresponds to a volume resulting from the change in the position of the switching pin in the sleeve chamber. This is the volume resulting from the displaced cross-section of the switching pin.

The closing force of the pressure spring loading the opening valve body is calculated such that it only closes the opening valve against the prevailing pressure in the sleeve chamber. However, the spring permits the return of the switching member.

According to a further embodiment of the invention, the switching pin includes a bore. The bore, together with a sleeve arranged in the bore, forms a receiving chamber for the opening valve body and the pressure loading spring. The sleeve includes the valve seat for the opening valve body. The sleeve is provided with a formed-on collar. The opening of the through-channel, towards the sleeve chamber, is arranged in the free end face of the collar. The collar serves as a contact face for one of the switching faces of the switching member with the switching member in the correct position. Furthermore, the collar can be used to support the opening spring.

The switching pin, together with the opening spring, are preferably positioned in a bore portion of the valve body. At the sleeve chamber end, the through-bore starts which ends in the end face of the valve body.

The soft seal is advantageously positioned in a recess arranged between the bore portion and the through-bore. The seal can then be held by a disc in the recess. The disc is supported by the opening spring.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is illustrated in the drawing and will be explained in greater detail with reference thereto.

DETAILED DESCRIPTION OF THE DRAWINGS

Figure 1:
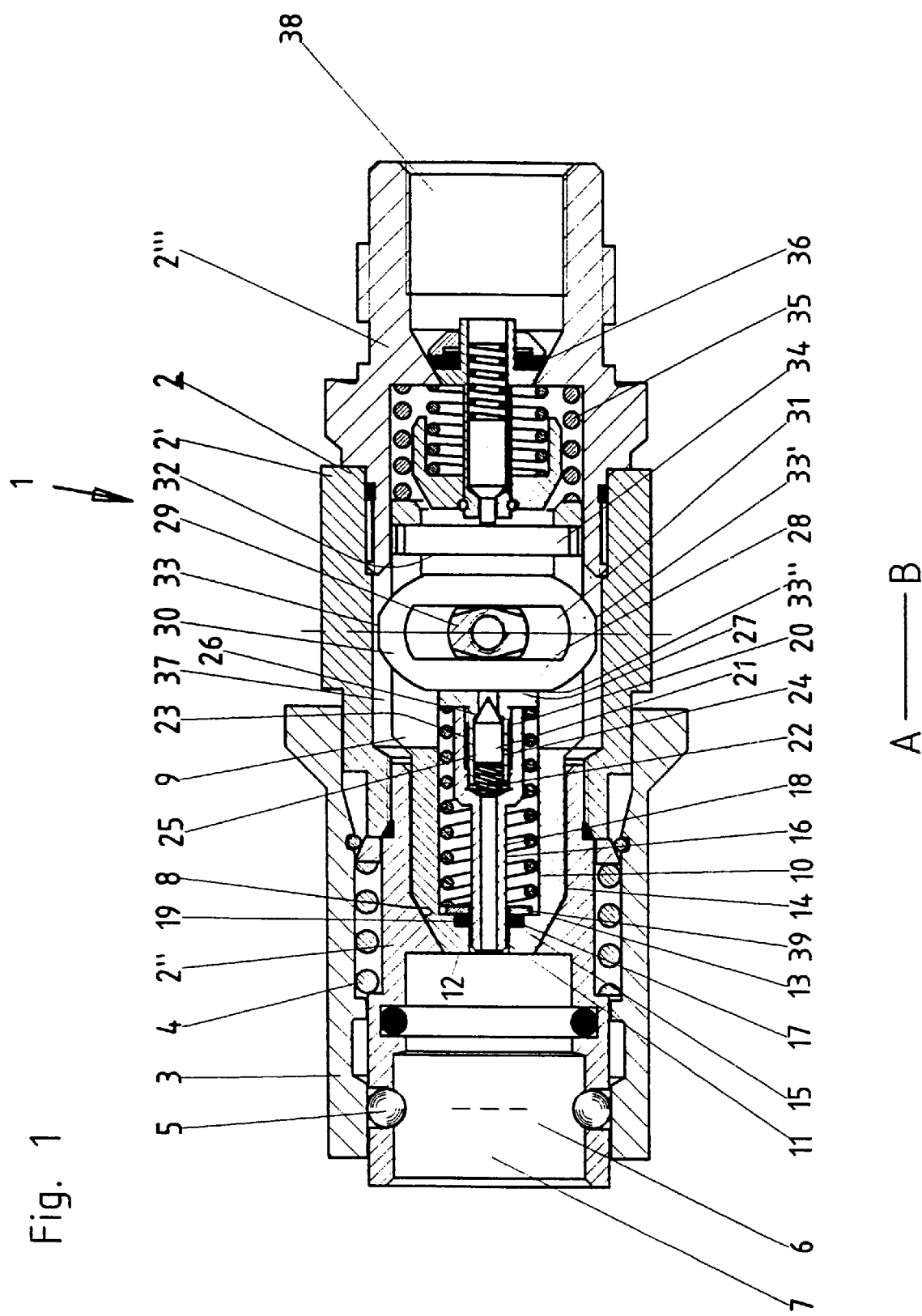
FIG. 1 is a longitudinal section view through a coupling sleeve, with a switching member and valve body in a closed position in accordance with the present invention.

FIG. 1 shows the coupling sleeve 1. The coupling sleeve 1 includes a housing 2 with a first housing part 2' which forms the basic member of the one end. A second housing part 2" is connected by a threaded connection and seals to the first housing part 2'. The second housing part 2" includes a receiving member 6 to couple and arrest a coupling plug 41. To arrest such a coupling plug 41, a locking sleeve 3 is provided to prevent locking balls 5, displaceable in radial bores of the second housing part 2", either from escaping radially outwardly for releasing purposes or to couple the coupling plug. Towards its basic position in which the locking balls 5 are locked, the locking sleeve 3 is loaded by a locking spring 4. The locking sleeve 3 is displaceably secured to the housing 2 along the longitudinal axis 7.

A third housing part 2''' is connected to the other end of the first housing part 2'. The third housing part 2''' is sealingly connected to the first housing part 2' by a threaded connection and seals.

The second housing part 2" is provided with a bore in which, towards the receiving means 6, a valve seat 8 is positioned. In the bore, a valve body 9 is displaceably received in the direction of the longitudinal axis 7 by its outer face 14. The valve body 9 is sealed relative to the valve seat 8, by a conically extending sealing face 13. If the outer face 14 is viewed in its cross-section, it can be seen that it has flattened parts which extend from the conical sealing face 13 to the region emerging from the bore of the second housing part 2". When the sealing face 13 of the valve body 9 is not in contact with the valve seat 8, pressure agent is allowed to escape.

The valve body 9 has a bore step 10 from which the through-bore 11 starts. The through-bore 11 is open towards the end face 12 of the valve body 9. Between the bore step 10 and the through-bore 11, a recess 15 is provided. Along the longitudinal axis 7, a switching pin 16 is displaceably received in the bore step 10.

The switching pin 16 has a pin portion 18 which is cylindrical in shape. The pin portion 18 in the closed position, shown in FIG. 1, projects into the through-bore 11. To create a sealing effect between the valve body 9 and the pin portion 18, a soft seal 19 is received in the recess 15.

Furthermore, the switching pin 16 includes a receiving portion 20 whose diameter is enlarged relative to the pin portion 18. The receiving portion 20 has a threaded bore 23 into which a sleeve 24 is threaded via an outer thread. The sleeve 24 is provided with a collar 27 which serves as a supporting base for an opening spring 40. The other end of the opening spring 40 is supported via a disc 39 at the end of the bore step 10 of the valve body 9. The opening spring 40 loads the switching pin 16 into a closed position, displaced towards the right in FIG. 1.

The switching pin 16 is provided with a through-channel 17. The through-channel 17 extends from its end face adjoining the end face 12 to the end face 28 of the collar 27 of the sleeve 24. The through-channel 17 increases in size in one region to a receiving region for a pressure spring 22 and an opening valve body 21.

The opening valve body 21 has a conical sealing face which is loaded towards a valve seat 26. The opening valve body 21, by means of its cylindrical outer face, is displaceably guided in a receiving bore 25 of the sleeve 24 along the longitudinal axis 7. The body 21 is provided with flattened regions or channels (not visible) or with an outer diameter which is reduced relative to that of the receiving bore 25, so that pressure agent or fluid can move from one end of the through-channel 17 to the other end of same.

A switching member 30 is provided to actuate the valve body 9. The switching member 30 is switched by a switching shaft 29. The switching shaft 29 extends transversely through the first housing part 2' and has an actuating member (not illustrated). The switching member 30 is received in a cut-out of the valve body 9. The cut-out is yoke-shaped and closed by a bridge 34 at its end. On its outer face, the switching member 30 is provided with switching faces 33, 33', 33".

In the closed position as illustrated in FIG. 1, the switching face 33" is in contact with the end face 28 of the switching pin 16. Thus, end face 28 forms a contact face. The switching pin 16 and the threaded sleeve 24 connected to it behave like one single component. The opening spring 40 holds the pin and sleeve with the end face 28 in contact with one of the switching faces 33, 33". The switching face 33' serves to load the switching face 32 of the bridge 34, which, in turn, serves to actuate the sleeve valve 36 which, in the open position, creates a passage to the pressure agent connection 38.

The valve body 9 is loaded by a closing spring 35 in the direction of the longitudinal axis 7 such that the sealing face 13 is held in contact with the valve seat 8. Furthermore, the switching member 30 has an oblong hole 31 through which the switching shaft 29 passes. In the closed position, the oblong hole 31 is orientated such that, along the longitudinal axis 7, a relative displacement between the switching member 30 and the switching shaft 29 is not possible. If, by mistake, the switching member 30 is moved such that the coupling sleeve would be opened if no coupling plug was in the receiving means 6, the switching face 33', upon rotational displacement, comes into contact with the switching face 32 of the bridge 34 of the valve body 9 and tries to displace the valve body 9 in direction B. At the same time, as a result of contact between the switching face 30 and the end face 28 of the collar 27 of the sleeve 24 connected to the switching pin 16, which end face 28 serves as a contact face, the switching pin 16 is displaced in direction A against the force of the opening spring 40. However, the valve body 9 cannot be displaced in direction B, because the force of the closing spring 35 is greater than the force of the opening spring 40, and it is only the switching pin 16 which is displaced. Thus, the switching pin 16 projects beyond the end face 12 by an amount which corresponds to the distance required to open the plug valve and to the distance required to move the valve body 9 into the open position.

If a coupling plug was arrested in the receiving means, a corresponding counter force would build up, so that the valve body 9 would be displaced in direction B. Thus, a relative displacement of the switching member 30 takes place together with the switching pin 16 in direction A within the perimeter of the oblong hole 31. The switching member 30 carries out a combined pivoting and longitudinal movement along the longitudinal axis 7. This continues until the open position illustrated in FIG. 2, and referring to the switching member 30, has been achieved. In this condition, the valve body 9, by its sealing face 13, continues to be in contact with the valve seat 8 and the sleeve valve 36 continues to be closed, so that no pressure agent can escape from the sleeve chamber 37 formed between the valve seat 8 and the sleeve valve 36.

Figure 2:
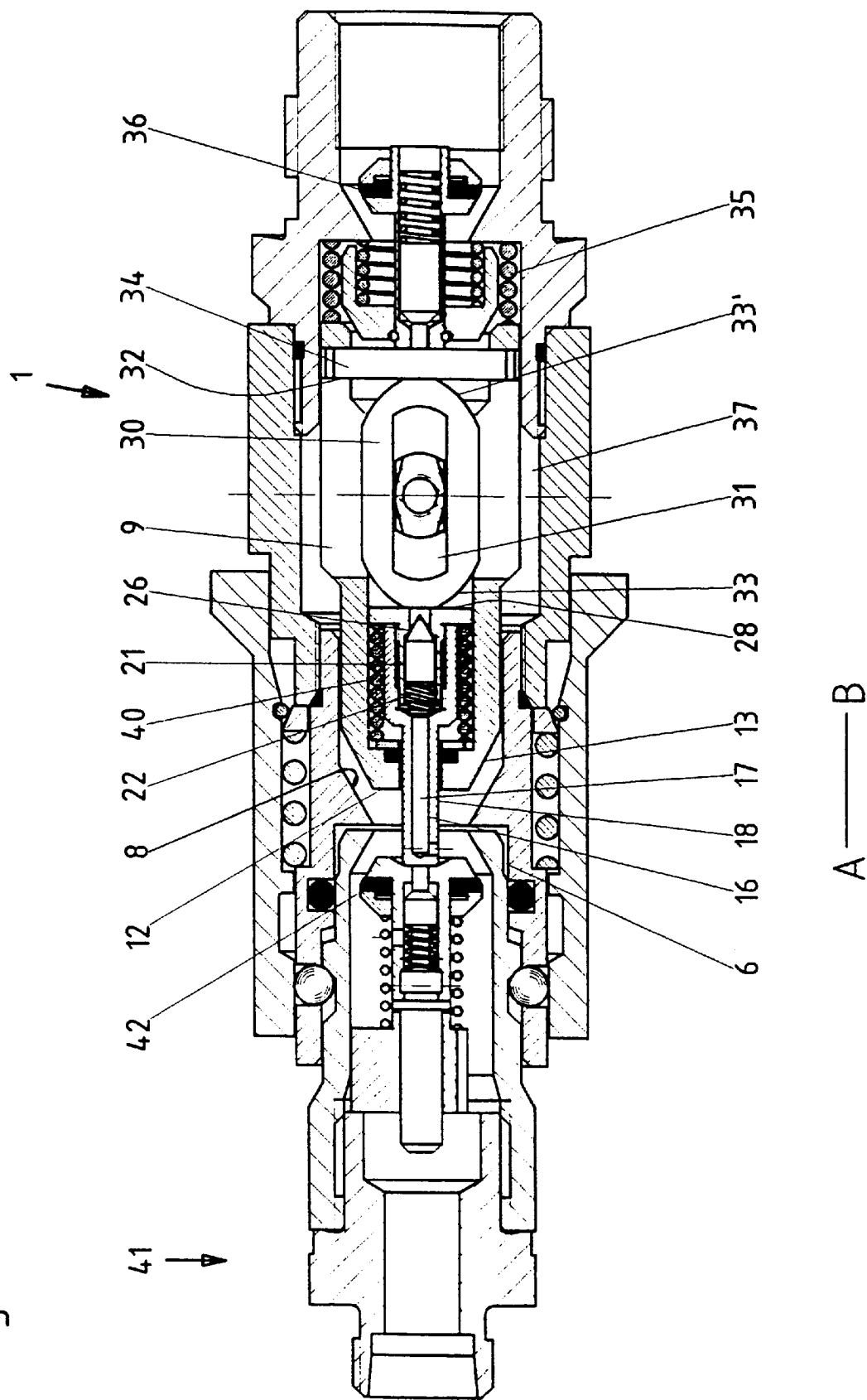
FIG. 2 is a view like FIG. 1, with the switching member in an open position and the switching pin in an open position and a coupling plug positioned in front of the receiving member of the coupling sleeve.

If, in the position of the switching member 30 as illustrated in FIG. 2, the coupling plug 41 is now introduced, the switching member 30 first has to be returned into the starting position according to FIG. 1. Thus, the switching pin 16, by means of the force of the opening spring 40, must be moved again in direction B. An operation has to take place against the fluid column which exists in the sleeve chamber 37 and which cannot escape towards the connection 38. This is achieved by the opening valve whose opening valve body 21 lifts off the valve seat 26 against the force of the pressure spring 22 and permits a small amount of pressure agent to leave the sleeve chamber 37 in the direction of the receiving member. The amount of pressure agent corresponds to the volume of the pin portion 18 projecting from the end face 12 of the valve body 9.

While the above detailed description describes the preferred embodiment of the present invention, the invention is susceptible to modification, variation and alteration without deviating from the scope and fair meaning of the subjoined claims.

What is claimed is:

1. A coupling sleeve for a hydraulic coupling comprising:

receiving means for receiving and arresting a coupling plug with a plug valve;

a valve seat and a valve body, said valve body movable relative to said valve seat along a longitudinal axis into an open position or closed position, a closing spring loads said valve body towards the closed position;

a switching pin for opening the plug valve in the coupling plug, said switching pin passes through the valve body in the direction of the longitudinal axis, said switching pin leaves said valve body through a through-bore in the direction of said receiving means;

a sleeve valve, a sleeve chamber positioned between said sleeve valve, and said valve seat for the valve body;

a switching member pivotably settable between two positions for establishing a connection between a pressure agent connection at the sleeve end and the coupling plug, said switching member with the coupling plug arrested in the receiving means sets the valve body against the force of the closing spring to the coupling plug and the switching member, with the coupling plug being arrested in the receiving means sets the valve body against the force of the closing spring, to switch the sleeve valve into the open position and to move the switching pin into the receiving means against the force of an opening spring loading said switching pin for opening the plug valve and said switching member, in a pivoted position corresponding to the open position and with the coupling plug in the uncoupled position, enable automatic transfer of the valve body and sleeve valve into a closed position; and said switching pin having a through-channel which is open towards its end face facing the coupling plug end and said through-channel towards the sleeve chamber includes an opening valve, said opening valve comprises a valve seat and an opening valve body which is loaded by a pressure spring against pressure in the sleeve chamber towards establishing contact with the valve seat and said valve body is associated with a soft seal arranged in the region of the through-bore and said soft seal having a sealing effect relative to the pin portion of the switching pin, which pin portion projects from the valve body.

2. A coupling sleeve according to claim 1, wherein the switching pin comprises a bore, said bore together with a sleeve arranged in said bore, form a receiving chamber for the opening valve body and for the pressure spring loading said opening valve body, and said sleeve includes the valve seat for the opening valve body.

3. A coupling sleeve according to claim 2, wherein the sleeve is provided with a collar, the collar has a free end face with an opening to the through-channel towards the sleeve chamber and said free end face serves as a contact face for switching faces of the switching member, and said collar supports the opening spring.

4. A coupling sleeve according to claim 1, wherein the switching pin, together with the opening spring, are positioned in a bore portion of the valve body, from which bore portion the through-bore at the sleeve chamber end starts.

5. A coupling sleeve according to claim 4, wherein the soft seal is received in a recess between the bore portion and the through-bore and is supported by a disc, said disc supporting the opening spring.

\* \* \* \* \*